Sept. 28, 1943.     J. M. ROBINSON     2,330,746
WEIGHING DEVICE
Filed March 14, 1941     2 Sheets-Sheet 2
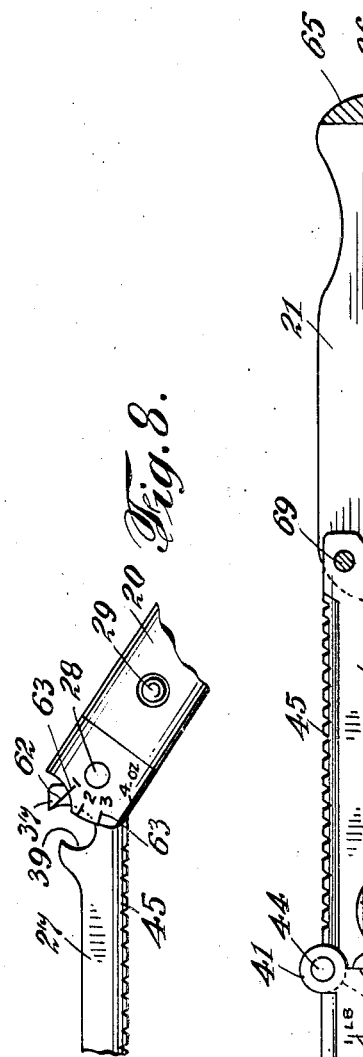
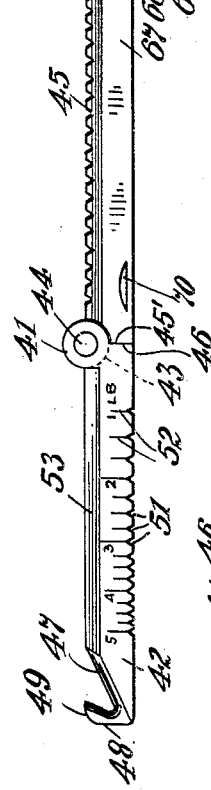
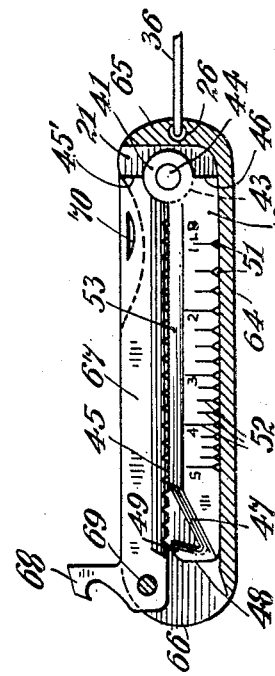
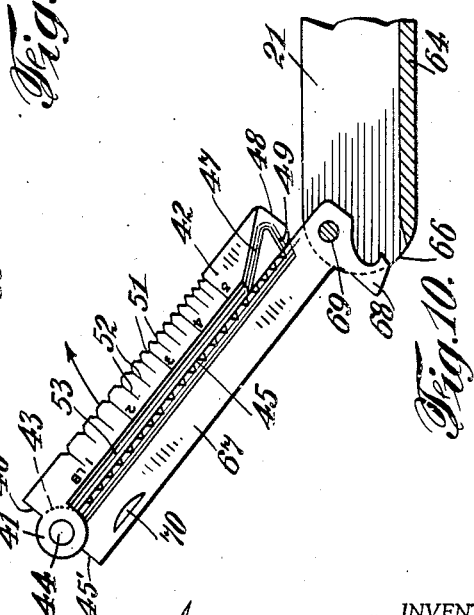
INVENTOR.
James M. Robinson
BY
ATTORNEY Patented Sept. 28, 1943

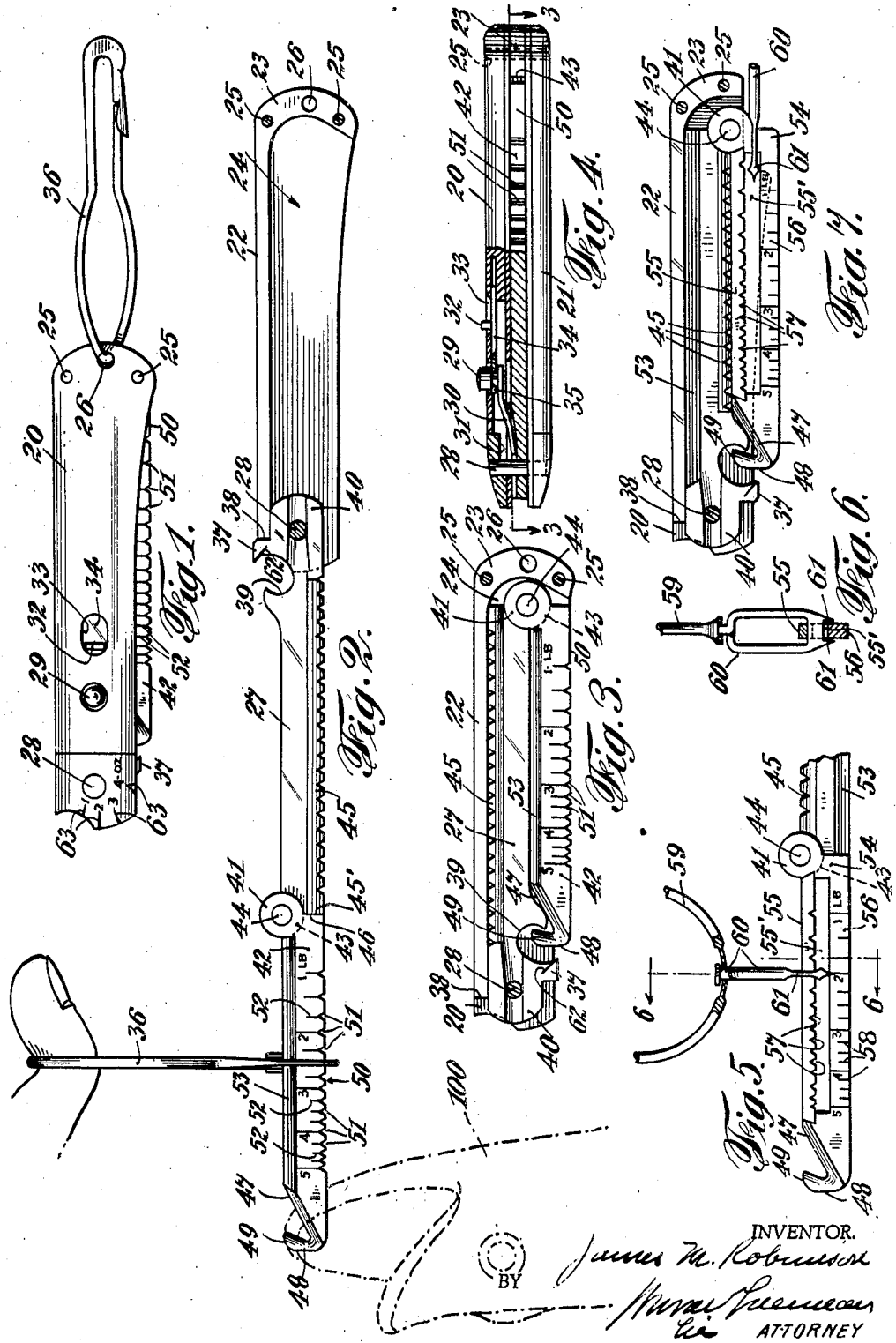

2,330,746

UNITED STATES PATENT OFFICE 2,330,746

WEIGHING DEVICE

James M. Robinson, New York, N. Y.

Application March 14, 1941, Serial No. 383,265

6 Claims. (Cl. 265—53)

My invention relates to weighing devices and refers particularly to weighing devices in which the weighing elements and their component parts may be revolubly inserted into an attached handle, thus forming a knife-like construction.

One object of my invention is a weighing device in which the scale beam may be inserted into an attached handle which acts as a counterweight for an object to be weighed.

Another object of my invention is a weighing device in which the scale beam may be inserted into an attached handle which acts as a counterweight for an object to be weighed, said scale beam being positioned between said handle and said object.

Another object of my invention is a weighing device comprising a plurality of revolubly attached elements attached to a handle which acts as a counterweight for an object to be weighed, said elements being capable of insertion into said handle.

Another object of my invention is a weighing device comprising a plurality of revolubly attached elements, which are a scale beam, attached to a handle which acts as a counterweight for an object to be weighed, said elements being capable of insertion into said handle.

Another object of my invention is a device comprising a plurality of revolubly attached elements, which are a scale beam, attached to a handle which acts as a counterweight for an object to be weighed when said device is suspended from a point on said scale beam, said elements being capable of insertion into said handle.

Another object of my invention is a device as above described having incorporated therein elements for the accomplishment of desired results other than simply the weighing of an object.

The above-mentioned and many other objects of my invention will be evident upon a consideration of my specification and its accompanying drawings.

Without in any way limiting the use of my devices for the convenience of fishermen, I describe their application for that particular purpose in order to explain their adaptation and usefulness.

There are four operations which every fisherman is desirous of applying to a fish—weighing the fish, scaling it, cutting off its head and tail and opening it in order to clean its interior—all of which are necessary in order to prepare a fish for its cooking operations.

These operations are at present performed by a number of devices, each adapted for one specific purpose, and hence, a fisherman must carry a number of such devices, which incurs inconvenience and the danger of losing, or misplacing, one or more of them, thus making the operation of all four processes impossible.

The basic idea of my invention is to produce a single device, which will enable all four desirable objects, the elements forming one unitary device in a small compact form, thus overcoming all danger of the absence of any particular element when it is needed.

The novelty and usefulness of the devices of my invention will be evident upon a consideration of my specification and its accompanying drawings, in which similar parts are designated by similar numerals.

Figure 1 is a side view of one form of my device in closed, or folded, condition.

Figure 2 is a side view of the form of my device in extended, or open, condition, with one side of the handle removed for purposes of explanation.

Figure 3 is a section through the line 3—3 of Figure 4.

Figure 4 is a front view of Figure 3, partially in section.

Figure 5 is a fragmentary side view of a modified form of a scale beam of a device of my invention.

Figure 6 is a section through the line 6—6 of Figure 5.

Figure 7 is a vertical section through a device of my invention containing the scale beam of Figures 5 and 6, the elements of the device being in closed, or folded, condition.

Figure 8 is a fragmentary side view of the connecting portions of a handle and a blade-link with weight indicia thereon.

Figure 9 is a side view of a modified form of my device in extended, or open, position, with one side of the handle removed for purposes of explanation.

Figure 10 is a fragmentary view of the device of Figure 9 in partly folded condition.

Figure 11 is a vertical section through the completely folded and closed device of Figures 9 and 10.

The particular form of a device of my invention illustrated in Figures 1 to 4 comprises a handle having the two spaced side members 20 and 21 and a back member 22 positioned between the side members 20 and 21, one end of which forms a closure 23, thus forming a blade-receiving compartment 24 opening forwardly. The side members 20 and 21 and the back member 22 are fixedly attached to each other by means of rivets 25 and 25 and have an opening 26 therethrough.

The blade-carrying end of the handle is formed by the two end portions 20 and 21 of the handle and the blade portion 27 of the device attached to each other by the pivot pin 28 passing through openings in the handle end portions 20 and 21 and an opening in the blade portion 27, said blade portion 27 being revoluble upon said pin 28.

The side member 20 carries a blade-locking mechanism comprising a push-button 29 capable of inward and outward movement through an opening in the side member 20, the inward movement of which will force the free end of the spring 30 upwardly against the shoulder 31 of side member 20, the spring being normally as shown particularly in Figure 4.

The side member 20 carries also a locking member adapted to prevent the movement of the push-button 29 and comprises an extension 32 passing through a longitudinally elongated opening 33 in the side member 20 and carrying a member 34, the free end 35 of which is forked shape. When the member 32 is moved toward the push-button 29, the forked end 35 enters into an annular recess of the push-button, thus locking the push-button from inward and outward movement.

A member 36 of safety-pin construction passes through the opening 26 of the handle.

The blade element 27 of the series of blade elements is a flat piece of steel, or other suitable material, the inward end portion of which carries the upwardly extended hook portion 37 having the shoulder 38 and forming the recess 39. The extreme inner end 40 is rounded as shown.

The outer end portion of the blade link 27 has an upwardly extended annular hinge member 43 positioned behind the extended annular hinge member 41 of the blade link 42, the two hinge members 43 and 42 being revolubly connected by the annular rivet 44, thus forming a hinge.

The blade link 27 has its lower edge 45 notched or serrated, for purposes to be described later.

As previously stated, the blade link 42 has its one end extended upwardly forming the annular hinge member 41 which is combined to the annular member of the blade link 27 forming a hinge between the two blade link members, which are maintained in parallel position with respect to each other by the abutment of the end 45' of the blade link member 27 upon the end 46 of the blade link member 42.

The outer end portion of the blade link 42 is inclined downwardly 47, thence upwardly 48; the extremity being inclined somewhat inwardly forming a hook 49, as shown in the drawings. The inner edge of this hook-like member is sharpened to a cutting edge for purposes to be described later.

The lower edge 50 of the blade link 42 has a number of notched recesses 51, 51 each notch having a mark 52, indicating pounds and fractions of pounds, and the upper edge 53 thereof is sharpened forming a knife edge.

The operation of this form of my devices is as follows:

When the knife is in its folded position as shown in Figure 1, the loop-member 36 may be employed as means for suspending the device in any desirable and convenient place.

As my device is adapted particularly with respect to fish, I will describe it for that purpose, but it is to be understood that I do not limit it to that particular use.

When it is desired to use the knife, the push-button 29 is pressed inwardly, thus releasing the blade-links 27 and 42 for removal from within the handle. It will be noted that the metallic top member 22 is attached at only one end and, hence, the spring action of the other end upon the end of the blade-link 27 will retain the blade-links in the handle.

The two folded blade-links 27 and 42 are then revolved about the screw 28 until they are in parallel position with respect to the longitudinal axis of the handle, and they cannot be revolved further because of the abutment of the shoulder 38 upon the end of the top member 22. When the knife is in this position the notched, or serrated, edge 45 of the blade-link 27 can be employed for scaling a fish.

When the blade-link 42 is revolved upon the hinge member 43, the elements of my device are positioned as shown in Figure 2, and the further revolution of the blade-link 42 is prevented by the abutment of the two end members 45' and 46 upon each other.

In this position the sharpened end 53 may be employed for cutting purposes, and the sharpened hook member 47—48—49 may be used for opening the fish by inserting the hook into one end of the stomach of a fish and drawing it longitudinally.

When the knife is in this position it may be also employed for weighing a fish 100 by removing the member 36 and removably attaching it to the blade-link 42, with this blade-link within the narrow portion of the member 36 and suspending the fish by means of the end hooks of the blade-member 42, as shown in Figure 2. If now the member 36 be suspended, as by a finger as shown, it will act as a fulcrum for the thus formed scale-bar, with the fish at one end and the handle at the other end, and for purposes of ounce-weights the handle should be moved downwardly into a position toward right angles to the axis of the scale-bar. If, now, the suspending member 36 be moved along the blade-link 42 until a balance is obtained, the weight of the fish can be determined by the indicia of the notch within which the member 36 has been inserted; the notches having been carefully and accurately positioned to indicate a proper weight under such circumstances.

The contour of the recess 39 of the blade-link 27 is adapted for the removal of metallic caps from bottles.

It is, of course, evident that the sequence of cutting, scaling and weighing may be varied as desired.

In the modified form of my device shown in Figures 5, 6 and 7, the formation of the end blade-link is changed somewhat. In this form this end blade-link 54 comprises the two spaced members 55 and 56, forming an opening 55', the lower edge of 55 having a number of notches 57, 57 therein positioned with respect to the weight of an object being weighed, while the lower member 56 carries indicia 58, 58, indicating weights corresponding to the notches of the member 55.

The suspending member 59 adapted for use with this form of device carries a ring-shaped swivel 60 from which is suspended a pointer 61, the member 55 passing through the ring-shaped member 60, the pointer thus indicating the weight of the object corresponding to the balancing notch in the member 55.

The modification of my devices shown in Figure 8 is adapted for a finer determination of weights than can be indicated by the indicia upon the outer blade-link. In this form the hook member 37 of blade-link 27 has a mark or line 62 thereon and the end of the handle has a plurality of marks or lines 63, 63. In this form of my device advantage is taken of the fact that the weight leverage changes as the handle is revolved from its horizontal position. If, for example, the indicator upon the blade-link 42 shows that a fish weighs between two and one-half pounds and two and three-quarters pounds, the indicia being limited to quarter pound weights, the indicator would be set for two and three-quarters pounds and the handle would be revolved downwardly until a balance was obtained and the actual weight would be two and three-quarters pounds minus the number of ounces indicated by the line 62 and the line 63 in alignment.

The modified form of my device shown in Figures 9, 10 and 11 is a simplified form of a knife possessing the properties of the devices of my invention.

The handle of this form of my device is an ordinary knife handle without means for locking the blades therein and has the bottom 64 and the ends 65 and 66, the end 66 having an opening therein between the two sides of the handle for the revoluble movement of blades to be contained within the handle. A blade-link 67 has the downwardly extended hook-like member 68 revolubly carried by the handle by means of the pivot 69, the upper edge of the blade-link being notched, or serrated, for the scaling of fish. The hingedly-attached blade-link is similar to that shown and described in Figures 1, 2, 3 and 4 and similar numerals are therefore employed. The indentation 70 is for the insertion of a finger nail to remove the blades from the holder. The lower edge of the member 68 is inclined as shown and abuts upon the inclined end of the bottom 64, when the blade-links are extended horizontally, thus preventing their further movement. It will be noted that the weighing, cutting and scaling effects are all produced by a downward pressure upon the blade-links and, hence, this abutment between the members 68 and 64 maintains the blade-links in rigid position during all of these operations.

It will thus be seen that my invention presents devices so constructed that by a cooperation of parts they can be applied to a variety of uses including the weighing, scaling and opening of fish, ordinary cutting and the opening of bottles, and that they are compact in form, accurate in action and easily and readily operated.

I do not limit myself to the particular size, shape, number, arrangement or material of parts as specification shows and describes, as these are given solely for the purpose of clearly describing the devices of my invention.

What I claim is:

1. A weighing device comprising a handle, a scale beam carried by said handle and capable of extension therefrom, a plurality of weight indicia carried by said scale beam, revoluble means permitting said scale beam to move from its extended position into said handle and means whereby the suspension of said device at one of its indicia will balance said scale beam and such indicia will indicate the weight of an object carried by the free end of said scale beam.

2. A weighing device comprising a handle, a blade-link revolubly carried by said handle, a scale beam blade-link revolubly carried by said first mentioned blade-link, means adapted to allow said blade-links to be folded upon each other and into said handle, cooperative means carried by said links adapted to prevent the downward folding of said links when in extended position and supported by said handle, a plurality of weight indicia carried by said scale beam blade-link and means whereby the suspension of said device at one of its indicia will balance said scale beam and such indicia will indicate the weight of an article carried by the free end of said scale beam, said indicia being positioned between said handle and said article.

3. A weighing device comprising a handle, a blade-link revolubly carried by said handle, a scale beam blade-link revolubly carried by said first mentioned blade-link, means adapted to allow said blade-links to be folded upon each other and into said handle, cooperative means carried by said links adapted to prevent the downward folding of said links when in extended position and supported by said handle, a plurality of weight indicia carried by said scale beam blade-link, a sharpened hook end to said scale beam blade-link and means whereby the suspension of said device at one of its indicia will balance said scale beam and such indicia will indicate the weight of an article carried by the free end of said scale beam, said indicia being positioned between said handle and said article.

4. A weighing device comprising a handle, a blade-link revolubly carried by said handle, a scale beam blade-link revolubly carried by said first mentioned blade-link, means adapted to allow said blade-links to be folded upon each other and into said handle, a plurality of weight indicia carried by said scale beam blade-link, an edge of at least one of said blade-links being notched, a sharpened hook end to said scale beam blade-link and means whereby the suspension of said device at one of its indicia will balance said scale beam and such indicia will indicate the weight of an article carried by the free end of said scale beam, said indicia being positioned between said handle and said article.

5. A weighing device comprising a handle, a blade-link revolubly carried by said handle, a second blade-link revolubly carried by said first mentioned blade-link, means adapted to allow said blade-links to be folded upon each other and into said handle, cooperative means carried by said links adapted to prevent the downward folding of said links when in extended position and supported by said handle, a plurality of weight indicia carried by said second blade-link, said indicia being positioned between said handle and an object to be weighed and means whereby the suspension of said device at one of its indicia will balance said device and such indicia will indicate the weight of an object carried by the free end of the second blade-link, the handle acting as a counterweight therefor.

6. A weighing device comprising a handle, a blade-link revolubly carried by said handle, a second blade-link revolubly carried by said first mentioned blade-link, means adapted to allow said blade-links to be folded upon each other and into said handle, cooperative means carried by said links adapted to prevent the downward folding of said links when in extended position and supported by said handle, a plurality of weight indicia carried by said second blade-link, said indicia being positioned between said handle and an object to be weighed, weight indicia carried by said first blade-link and said handle adapted to cooperate with each other upon a revoluble movement of said first blade-link and said handle with respect to each other, and means whereby the suspension of said device at one of its first mentioned indicia will balance said device and such first and second indicia will indicate the weight of an object carried by the free end of the second blade-link, the handle acting as a counterweight therefor.

JAMES M. ROBINSON.